US011232221B2

(12) United States Patent
Novotny et al.

(10) Patent No.: US 11,232,221 B2
(45) Date of Patent: Jan. 25, 2022

(54) RIGHT TO BE FORGOTTEN ON AN IMMUTABLE LEDGER

(71) Applicant: International Business Machines Corporation, Armonk, NY (US)

(72) Inventors: Petr Novotny, Mount Kisco, NY (US); Donna N. Dillenberger, Yorktown Heighls, NY (US); Nitin Gaur, Roundrock, TX (US)

(73) Assignee: International Business Machines Corporation, Armonk, NY (US)

( * ) Notice: Subject to any disclaimer, the term of this patent is extended or adjusted under 35 U.S.C. 154(b) by 211 days.

(21) Appl. No.: 16/132,708

(22) Filed: Sep. 17, 2018

(65) Prior Publication Data

US 2020/0092088 A1    Mar. 19, 2020

(51) Int. Cl.
G06F 21/62     (2013.01)
H04L 9/08     (2006.01)

(52) U.S. Cl.
CPC ........ *G06F 21/6218* (2013.01); *H04L 9/0819* (2013.01)

(58) Field of Classification Search
CPC .................................................. G06F 21/6218
See application file for complete search history.

(56) References Cited

U.S. PATENT DOCUMENTS

| 5,153,919 | A | * | 10/1992 | Reeds, III | ........... | H04W 12/069 380/44 |
| 9,569,771 | B2 | | 2/2017 | Lesavich et al. | | |
| 9,774,578 | B1 | | 9/2017 | Ateniese et al. | | |
| 10,320,843 | B1 | * | 6/2019 | Dobrek | ................. | H04L 9/0891 |
| 10,333,721 | B2 | * | 6/2019 | Uhr | ....................... | H04W 12/08 |
| 10,410,190 | B1 | * | 9/2019 | Kapoor | .................... | G06F 9/547 |
| 2002/0131595 | A1 | * | 9/2002 | Ueda | ..................... | H04L 9/0625 380/201 |
| 2002/0169776 | A1 | * | 11/2002 | Tuunanen | ........... | H04L 65/1096 |
| 2007/0005512 | A1 | * | 1/2007 | Nishiguchi | ............ | G06F 21/72 705/71 |
| 2016/0321654 | A1 | * | 11/2016 | Lesavich | ............ | G06F 16/9554 |
| 2017/0046651 | A1 | * | 2/2017 | Lin | .................... | G06Q 20/367 |
| 2017/0116693 | A1 | | 4/2017 | Rae et al. | | |

(Continued)

FOREIGN PATENT DOCUMENTS

WO     2017145010 A1     8/2017

OTHER PUBLICATIONS

Aslan Askarov, Scott Moore, Christos Dimoulas, and Stephen Chong "Cryptographic Enforcement of Language-Based Information Erasure," 2015 IEEE 28th Computer Security Foundations Symposium, Year: 2015, pp. 334-348.

(Continued)

*Primary Examiner* — Bradley W Holder

(57) ABSTRACT

An example operation may include one or more of receiving a transaction request into at least one node of a blockchain network, the transaction request comprising one or more transaction parameters and one or more encryption keys, processing the transaction request to produce a transaction result, encrypting one or more parameters of the transaction result to produce an encrypted transaction result, storing the encrypted transaction result in a data block of the blockchain, and storing the one or more encryption keys in one or more key stores of the blockchain network.

20 Claims, 15 Drawing Sheets

(56) References Cited

U.S. PATENT DOCUMENTS

| | | | | |
|---|---|---|---|---|
| 2017/0177898 A1* | 6/2017 | Dillenberger | ......... | H04L 9/3236 |
| 2017/0195336 A1* | 7/2017 | Ouellette | ................ | G07C 9/27 |
| 2017/0236121 A1* | 8/2017 | Lyons | ................ | G06Q 20/065 |
| | | | | 705/71 |
| 2017/0358041 A1* | 12/2017 | Forbes, Jr | ............... | G05D 3/12 |
| 2018/0048485 A1* | 2/2018 | Pelton | ............... | G05B 19/0428 |
| 2018/0191502 A1* | 7/2018 | Karame | ............... | G06Q 20/02 |
| 2019/0347651 A1* | 11/2019 | Moreno | .............. | G06Q 20/385 |

OTHER PUBLICATIONS

Giuseppe Ateniese, Bernardo Magri, Daniele Venturi, and Ewerton Andrade, "Redactable Blockchain - or - Rewriting History in Bitcoin and Friends," 2017 IEEE European Symposium on Security and Privacy (EuroS&P), Year: 2017, pp. 111-126.

Richard Dennis, Gareth Owenson, and Benjamin Aziz "A Temporal Blockchain: A Formal Analysis," 2016 International Conference on Collaboration Technologies and Systems (CTS), Year: 2016, pp. 430-437.

\* cited by examiner

102

RIGHT TO BE FORGOTTEN ON AN IMMUTABLE LEDGER

TECHNICAL FIELD

This application generally relates to a database storage system, and more particularly, relates to a right to be forgotten on an immutable ledger.

BACKGROUND

A centralized database stores and maintains data in one single database (e.g., database server) at one location. This location is often a central computer, for example, a desktop central processing unit (CPU), a server CPU, or a mainframe computer. Information stored on a centralized database is typically accessible from multiple different points. Multiple users or client workstations can work simultaneously on the centralized database, for example, based on a client/server configuration. A centralized database is easy to manage, maintain, and control, especially for purposes of security because of its single location. Within a centralized database, data redundancy is minimized as a single storing place of all data also implies that a given set of data only has one primary record.

However, a centralized database suffers from significant drawbacks. For example, a centralized database has a single point of failure. In particular, if there are no fault-tolerance considerations and a hardware failure occurs (for example a hardware, firmware, and/or a software failure), all data within the database is lost and work of all users is interrupted. In addition, centralized databases are highly dependent on network connectivity. As a result, the slower the connection, the amount of time needed for each database access is increased. Another drawback is the occurrence of bottlenecks when a centralized database experiences high traffic due to a single location. Furthermore, a centralized database provides limited access to data because only one copy of the data is maintained by the database. As a result, multiple devices cannot access the same piece of data at the same time without creating significant problems or risk overwriting stored data. Furthermore, because a database storage system has minimal to no data redundancy, data that is unexpectedly lost is very difficult to retrieve other than through manual operation from back-up storage.

Distributed databases and in particular a blockchain based ledgers and databases provide various benefits over centralized systems. A fundamental aspect of the distributed ledger is that trust comes from immutability of the ledger. That is, the data on the ledger cannot be changed or deleted without affecting the entirety of a blockchain.

While blockchains and similar distributed ledgers have many benefits, there is a push within various data based systems to allow users the "Right to be Forgotten". This can be at odds with the immutability of the blockchain or distributed ledger. What is required is an improved distributed database system that supports the right to be forgotten.

SUMMARY

One example embodiment provides a system that includes a plurality of blockchain peer nodes programmed to perform one or more of receive a transaction request comprising one or more transaction parameters and one or more encryption keys, process the transaction request to produce a transaction result, encrypt one or more parameters of the transaction result to produce an encrypted transaction result, store the encrypted transaction result in a data block of the blockchain, and store the one or more encryption keys in one or more key stores of the blockchain network.

Another example embodiment provides a method that includes one or more of receiving a transaction request into at least one node of a blockchain network, the transaction request comprising one or more transaction parameters and one or more encryption keys, processing the transaction request to produce a transaction result, encrypting one or more parameters of the transaction result to produce an encrypted transaction result, storing the encrypted transaction result in a data block of the blockchain, and storing the one or more encryption keys in one or more key stores of the blockchain network.

A further example embodiment provides a non-transitory computer readable medium comprising instructions, that when read by a processor, cause the processor to perform one or more of receiving a transaction request, the transaction request comprising one or more transaction parameters and one or more encryption keys, processing the transaction request to produce a transaction result, encrypting one or more parameters of the transaction result to produce an encrypted transaction result, storing the encrypted transaction result in a data block of the blockchain, and storing the one or more encryption keys in one or more key stores of the blockchain network.

DETAILED DESCRIPTION

Figure 1A:
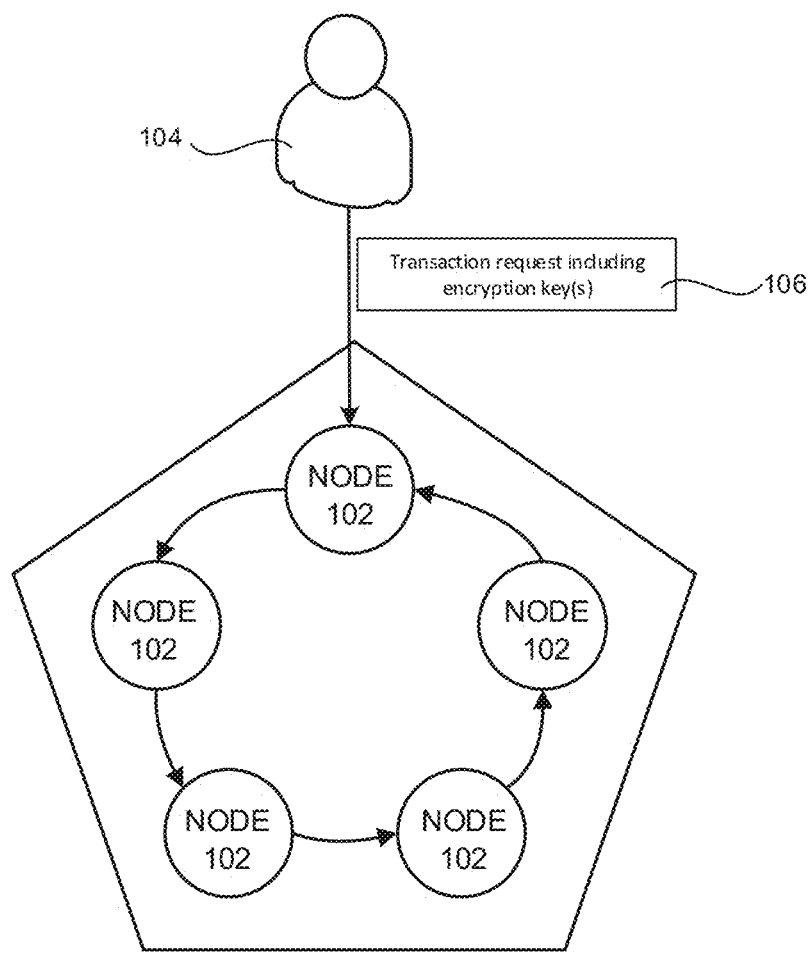
FIG. 1A illustrates a network diagram of a system operating a blockchain network, according to example embodiments.

It will be readily understood that the instant components, as generally described and illustrated in the figures herein, may be arranged and designed in a wide variety of different configurations. Thus, the following detailed description of the embodiments of at least one of a method, apparatus, non-transitory computer readable medium and system, as represented in the attached figures, is not intended to limit the scope of the application as claimed but is merely representative of selected embodiments.

The instant features, structures, or characteristics as described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

In addition, while the term "message" may have been used in the description of embodiments, the application may be applied to many types of network data, such as, packet, frame, datagram, etc. The term "message" also includes packet, frame, datagram, and any equivalents thereof. Furthermore, while certain types of messages and signaling may be depicted in exemplary embodiments they are not limited to a certain type of message, and the application is not limited to a certain type of signaling.

Example embodiments provide methods, systems, components, non-transitory computer readable media, devices, and/or networks, which support the right to be forgotten on a blockchain or similar immutable ledger.

A decentralized database is a distributed storage system which includes multiple nodes that communicate with each other. A blockchain is an example of a decentralized database which includes an append-only immutable data structure resembling a distributed ledger capable of maintaining records between mutually untrusted parties. The untrusted parties are referred to herein as peers or peer nodes. Each peer maintains a copy of the database records and no single peer can modify the database records without a consensus being reached among the distributed peers. For example, the peers may execute a consensus protocol to validate blockchain storage transactions, group the storage transactions into blocks, and build a hash chain over the blocks. This process forms the ledger by ordering the storage transactions, as is necessary, for consistency. In a public or permission-less blockchain, anyone can participate without a specific identity. Public blockchains often involve native cryptocurrency and use consensus based on various protocols such as Proof of Work (PoW). On the other hand, a permissioned blockchain database provides a system which can secure inter-actions among a group of entities which share a common goal but which do not fully trust one another, such as businesses that exchange funds, goods, information, and the like.

A blockchain operates arbitrary, programmable logic, tailored to a decentralized storage scheme and referred to as "smart contracts" or "chaincodes." In some cases, specialized chaincodes may exist for management functions and parameters which are referred to as system chaincode. Smart contracts are trusted distributed applications which leverage tamper-proof properties of the blockchain database and an underlying agreement between nodes which is referred to as an endorsement or endorsement policy. In general, blockchain transactions typically must be "endorsed" before being committed to the blockchain while transactions which are not endorsed are disregarded. A typical endorsement policy allows chaincode to specify endorsers for a transaction in the form of a set of peer nodes that are necessary for endorsement. When a client sends the transaction to the peers specified in the endorsement policy, the transaction is executed to validate the transaction. After validation, the transactions enter an ordering phase in which a consensus protocol is used to produce an ordered sequence of endorsed transactions grouped into blocks.

Nodes are the communication entities of the blockchain system. A "node" may perform a logical function in the sense that multiple nodes of different types can run on the same physical server. Nodes are grouped in trust domains and are associated with logical entities that control them in various ways. Nodes may include different types, such as a client or submitting-client node which submits a transaction-invocation to an endorser (e.g., peer), and broadcasts transaction-proposals to an ordering service (e.g., ordering node). Another type of node is a peer node which can receive client submitted transactions, commit the transactions and maintain a state and a copy of the ledger of blockchain transactions. Peers can also have the role of an endorser, although it is not a requirement. An ordering-service-node or orderer is a node running the communication service for all nodes, and which implements a delivery guarantee, such as a broadcast to each of the peer nodes in the system when committing transactions and modifying a world state of the blockchain, which is another name for the initial blockchain transaction which normally includes control and setup information.

A ledger is a sequenced, tamper-resistant record of all state transitions of a blockchain. State transitions may result from chaincode invocations (i.e., transactions) submitted by participating parties (e.g., client nodes, ordering nodes, endorser nodes, peer nodes, etc.). A transaction may result in a set of asset key-value pairs being committed to the ledger as one or more operands, such as creates, updates, deletes, and the like. The ledger includes a blockchain (also referred to as a chain) which is used to store an immutable, sequenced record in blocks. The ledger also includes a state database which maintains a current state of the blockchain. There is typically one ledger per channel. Each peer node maintains a copy of the ledger for each channel of which they are a member.

A chain is a transaction log which is structured as hash-linked blocks, and each block contains a sequence of N transactions where N is equal to or greater than one. The block header includes a hash of the block's transactions, as well as a hash of the prior block's header. In this way, all transactions on the ledger may be sequenced and cryptographically linked together. Accordingly, it is not possible to tamper with the ledger data without breaking the hash links. A hash of a most recently added blockchain block represents every transaction on the chain that has come before it, making it possible to ensure that all peer nodes are in a consistent and trusted state. The chain may be stored on a peer node file system (i.e., local, attached storage, cloud, etc.), efficiently supporting the append-only nature of the blockchain workload.

The current state of the immutable ledger represents the latest values for all keys that are included in the chain transaction log. Because the current state represents the latest key values known to a channel, it is sometimes referred to as a world state. Chaincode invocations execute transactions against the current state data of the ledger. To make these chaincode interactions efficient, the latest values of the keys may be stored in a state database. The state database may be simply an indexed view into the chain's transaction log, it can therefore be regenerated from the chain at any time. The state database may automatically be recovered (or generated if needed) upon peer node startup, and before transactions are accepted.

Some benefits of the instant solutions described and depicted herein include the ability to support a user's right to be forgotten while maintaining the immutability of the blockchain ledger. Through the use of different categories of encryption keys, the user is able to tailor their right to be forgotten by making encryption keys user specific, transaction specific, or category specific (i.e. a particular encryption key may be employed by the user for a particular set or category of transactions).

Blockchain is different from a traditional database in that blockchain is not a central storage but rather a decentralized, immutable, and secure storage, where nodes must share in changes to records in the storage. Some properties that are inherent in blockchain and which help implement the blockchain include, but are not limited to, an immutable ledger, smart contracts, security, privacy, decentralization, consensus, endorsement, accessibility, and the like, which are further described herein. Blockchain's immutability aspects prevent simple deletion of data and thus implementing a right-to-be-forgotten for users is not straight forward.

One of the benefits of the example embodiments is that it improves the functionality of a computing system by adding the ability to functionally delete data while maintaining the immutability aspects of the blockchain platform.

The example embodiments also change how data may be stored within a block structure of the blockchain. For example, as will be described in more detail below, a value of a key/value pair may be encrypted and stored, together with an identifier of an encryption key required to decode the encrypted value, in a data block of the blockchain. By storing encrypted values within data blocks of a blockchain, and separately storing the encryption keys, the values remain accessible to all users and data requests for as long the encryption key is available. Once a user requests deletion of an encryption key, the value is no longer functionally accessible, even though the ledger itself remains unchanged.

FIG. 1A illustrates a simplified diagram of a blockchain network that may be used in various embodiments for providing a right to be forgotten protocol, as will be described in more detail below. Referring to FIG. 1A, the network 100 includes a network of blockchain nodes/peers 102 that each store a copy of the distributed ledger or database as is known. The network 100 may be a public blockchain network. A public blockchain may achieve immutability and consensus through various known methods including, without limitation, proof of work, proof of stake, etc. Alternatively, the network 100 may a private network and may provide consensus and immutability through authentication protocols, certificates, etc. Users, e.g. user 104, may submit transaction data to one or more of the network nodes 102. The requested transaction 106 may be broadcast to the nodes 102 of the network 100 using P2P protocols or the like. The network 100 of nodes may validate the transaction and the user's status using various algorithms, which will typically be dependent on the network type, e.g. public or private (permissioned). Once verified, the transaction may be committed to a block of data. The data block may include other transaction data of other users. The new data block may be added to an existing blockchain in a way that is permanent and unalterable, in accordance with known blockchain methods. The method by which the block is added may be dependent on the blockchain network type and may require proof of work, proof of stake, or other protocols. Typically, the block will include a cryptographic hash of the data and/or a hash of the previous block of data. The requirement for a cryptographic hash in linked data blocks provides the immutable properties since any change to the data within a single data block will affect the hash in each subsequent block in the block chain.

The transaction submitted by the user may be a financial transaction, e.g. involving cryptocurrency or actual currency. However, as is well understood, blockchains can be used to store data related to many different types of transactions, financial and non-financial and thus the data may relate to contracts, records, or other types of information. Typically, a transaction will include a change in value of a particular parameter or key. Transactions will thus often include key/value pairs that specify the parameter (key) and the change in the value of that parameter key.

Figure 1B:
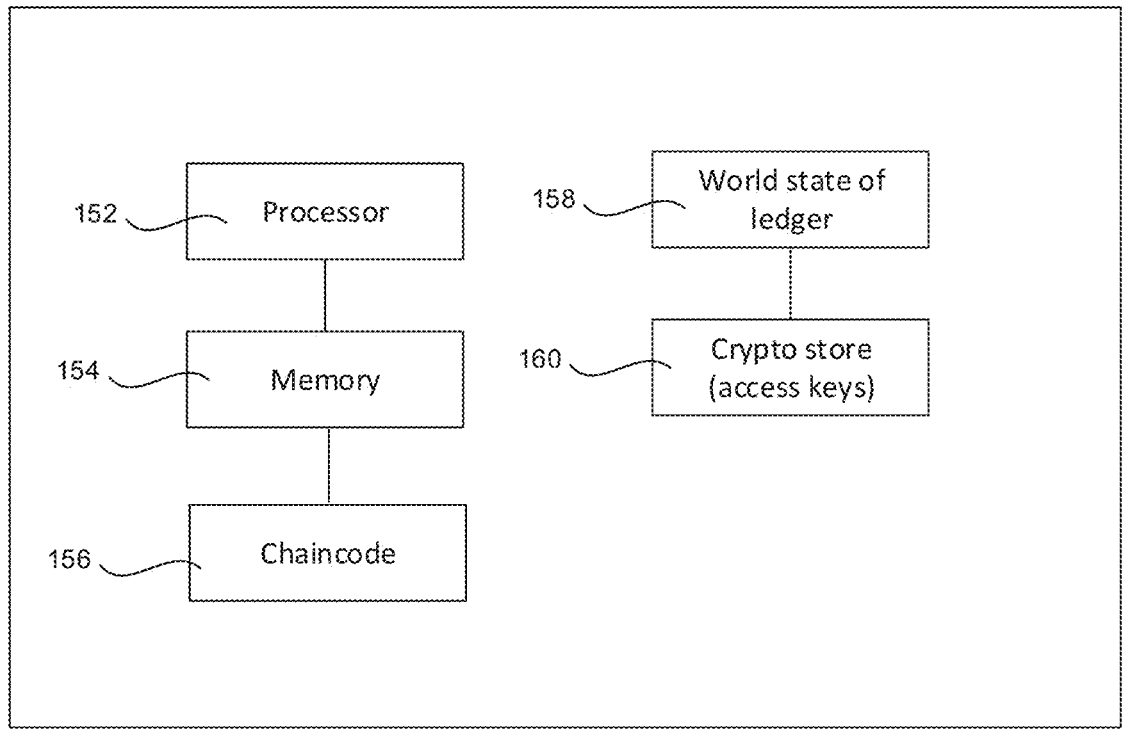
FIG. 1B illustrates a network diagram of a node of the blockchain network, according to example embodiments.

An embodiment of a node 102 that may be used for implementing a right-to-be-forgotten method is depicted in FIG. 1B. The node 102 will typically include at least one processor 152 and at least one memory 154 operatively associated with the at least one processor. The memory may include memory for storing data as well as random access memory used for executing code in performance of the functions of the node. The node may store chaincode 156 that is executed in performing transactions. The node will also typically store a world state of the blockchain 158. These features and functions of the node may be considered typical of an existing blockchain nodes, as would be understood by the person skilled in the art. In addition, the node may include a key store 160. As will be described in more detail below, one or more transactions may be encrypted using an encryption key prior to the transaction being stored on the blockchain. The encryption key may be stored in the key store within the node. When a user requests data to be retrieved from the blockchain (e.g. the world state), the key may be used to decrypt the data and then the data may be supplied to the requester.

The use of the key store 160 and encryption of data reconciles the immutability of the blockchain ledger with a right to be forgotten. When a user desires their data to be forgotten, the user may request deletion of the key pertaining to the data to be deleted from the key store. Thereafter, the data remains on the blockchain and can be still be retrieved but it cannot be decrypted. Thus, the data is, in essence, functionally forgotten.

Figure 2A:
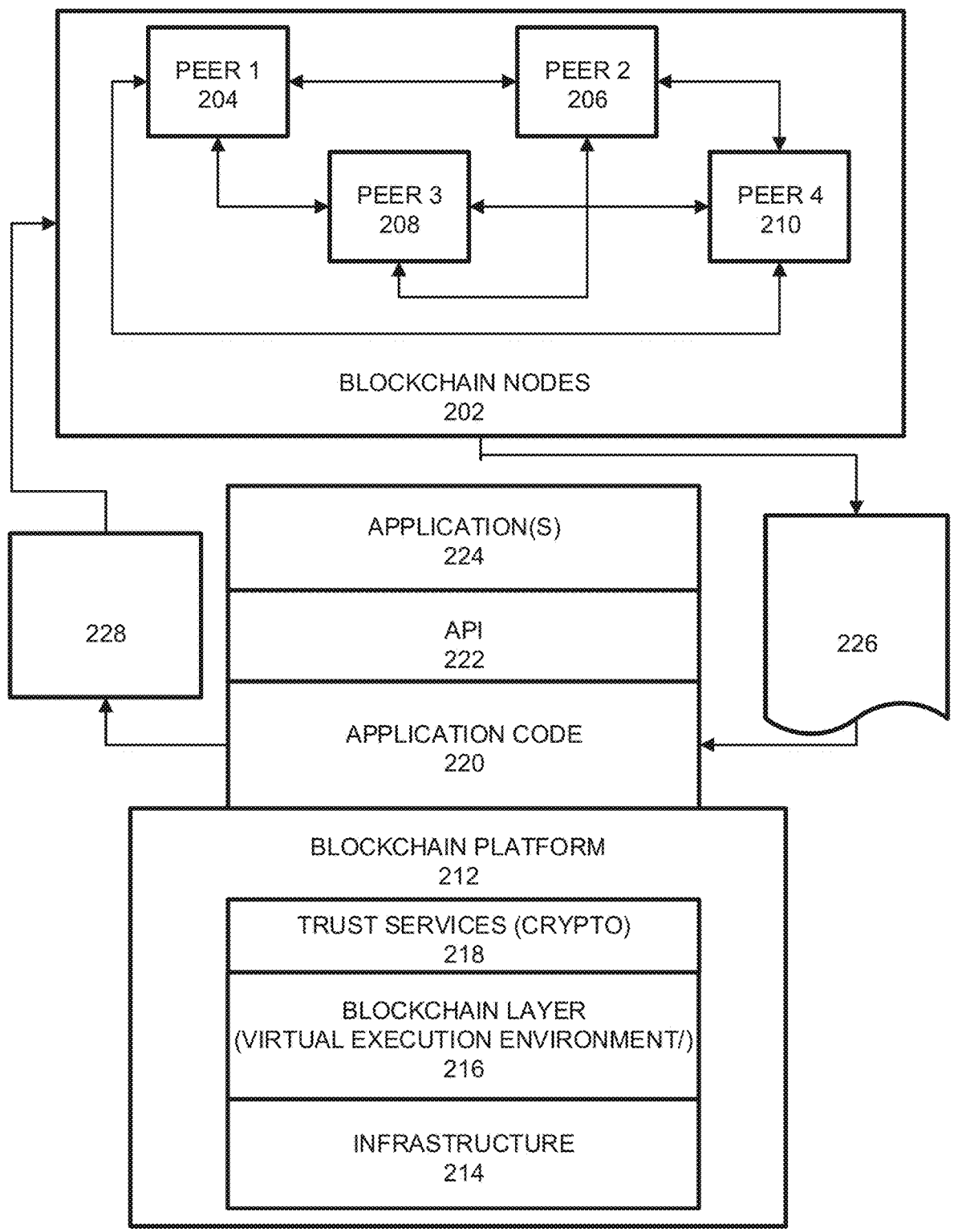
FIG. 2A illustrates an example peer node configuration, according to example embodiments.

FIG. 2A illustrates a blockchain architecture configuration 200, according to example embodiments. Referring to FIG. 2A, the blockchain architecture 200 may include certain blockchain elements, for example, a group of blockchain nodes 202. The blockchain nodes 202 may include one or more nodes 204-210 (these four nodes are depicted by example only). These nodes participate in a number of activities, such as blockchain transaction addition and validation process (consensus). One or more of the blockchain nodes 204-210 may endorse transactions based on endorsement policy and may provide an ordering service for all blockchain nodes in the architecture 200. A blockchain node may initiate a blockchain authentication and seek to write to a blockchain immutable ledger stored in blockchain layer 216, a copy of which may also be stored on the underpinning physical infrastructure 214. The blockchain configuration may include one or more applications 224 which are linked to application programming interfaces (APIs) 222 to access and execute stored program/application code 220 (e.g., chaincode, smart contracts, etc.) which can be created according to a customized configuration sought by participants and can maintain their own state, control their own assets, and receive external information. This can be deployed as a transaction and installed, via appending to the distributed ledger, on all blockchain nodes 204-210.

The blockchain base or platform 212 may include various layers of blockchain data, services (e.g., cryptographic trust services, virtual execution environment, etc.), and underpinning physical computer infrastructure that may be used to receive and store new transactions and provide access to auditors which are seeking to access data entries. The blockchain layer 216 may expose an interface that provides access to the virtual execution environment necessary to process the program code and engage the physical infrastructure 214. Cryptographic trust services 218 may be used to verify transactions such as asset exchange transactions and keep information private.

The blockchain architecture configuration of FIG. 2A may process and execute program/application code 220 via one or more interfaces exposed, and services provided, by blockchain platform 212. The code 220 may control blockchain assets. For example, the code 220 can store and transfer data, and may be executed by nodes 204-210 in the form of a smart contract and associated chaincode with conditions or other code elements subject to its execution. As a non-limiting example, smart contracts may be created to execute reminders, updates, and/or other notifications subject to the changes, updates, etc. The smart contracts can themselves be used to identify rules associated with authorization and access requirements and usage of the ledger. For example, the information 226, such as a transaction request including encryption details, may be processed by one or more processing entities (e.g., virtual machines) included in the blockchain layer 216. The result 228 may include encrypted transaction data including an identifier for the encryption key to be stored in a key store. The physical infrastructure 214 may be utilized to retrieve any of the data or information described herein.

Within chaincode, a smart contract may be created via a high-level application and programming language, and then written to a block in the blockchain. The smart contract may include executable code which is registered, stored, and/or replicated with a blockchain (e.g., distributed network of blockchain peers). A transaction is an execution of the smart contract code which can be performed in response to conditions associated with the smart contract being satisfied. The executing of the smart contract may trigger a trusted modification(s) to a state of a digital blockchain ledger. The modification(s) to the blockchain ledger caused by the smart contract execution may be automatically replicated throughout the distributed network of blockchain peers through one or more consensus protocols.

The smart contract may write data to the blockchain in the format of key-value pairs. Furthermore, the smart contract code can read the values stored in a blockchain and use them in application operations. The smart contract code can write the output of various logic operations into the blockchain. The code may be used to create a temporary data structure in a virtual machine or other computing platform. Data written to the blockchain can be public and/or can be encrypted and maintained as private. The temporary data that is used/generated by the smart contract is held in memory by the supplied execution environment, then deleted once the data needed for the blockchain is identified.

A chaincode may include the code interpretation of a smart contract, with additional features. As described herein, the chaincode may be program code deployed on a computing network, where it is executed and validated by chain validators together during a consensus process. The chaincode receives a hash and retrieves from the blockchain a hash associated with the data template created by use of a previously stored feature extractor. If the hashes of the hash identifier and the hash created from the stored identifier template data match, then the chaincode sends an authorization key to the requested service. The chaincode may write to the blockchain data associated with the cryptographic details. In FIG. 2A, the data written may include an encrypted transaction including key/value pairs where at least the values are encrypted. The result 228 may include the encrypted transaction data to be written into the block chain and the encryption key(s) to be stored in the key stores at the nodes 204-210.

Figure 2B:
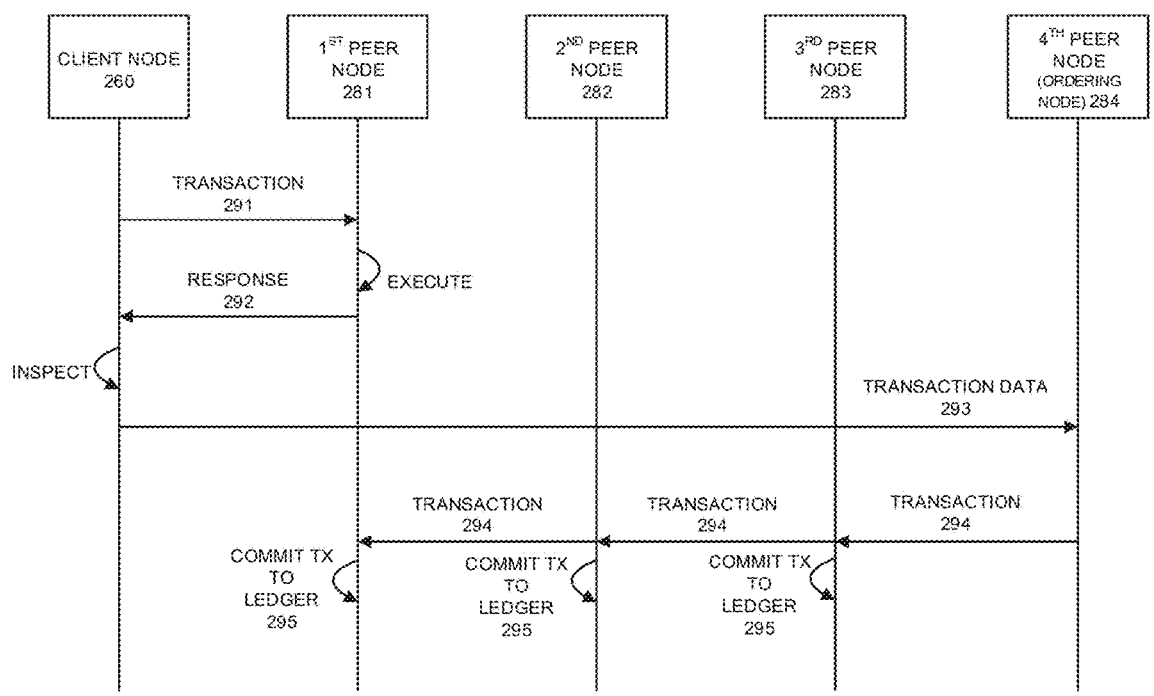
FIG. 2B illustrates a further peer node configuration, according to example embodiments.

FIG. 2B illustrates an example of a transactional flow 250 between nodes of the blockchain in accordance with an example embodiment. Referring to FIG. 2B, the transaction flow may include a transaction proposal 291 sent by an application client node 260 to an endorsing peer node 281. The endorsing peer 281 may verify the client signature and execute a chaincode function to initiate the transaction. The output may include the chaincode results, a set of key/value versions that were read in the chaincode (read set), and the set of keys/values that were written in chaincode (write set). The proposal response 292 is sent back to the client 260 along with an endorsement signature, if approved. The client 260 assembles the endorsements into a transaction payload 293 and broadcasts it to an ordering service node 284. The ordering service node 284 then delivers ordered transactions as blocks to all peers 281-283 on a channel. Before committal to the blockchain, each peer 281-283 may validate the transaction. For example, the peers may check the endorsement policy to ensure that the correct allotment of the specified peers have signed the results and authenticated the signatures against the transaction payload 293.

Referring again to FIG. 2B, the client node 260 initiates the transaction 291 by constructing and sending a request to the peer node 281, which is an endorser. The client 260 may include an application leveraging a supported software development kit (SDK), such as NODE, JAVA, PYTHON, and the like, which utilizes an available API to generate a transaction proposal. The proposal is a request to invoke a chaincode function so that data can be read and/or written to the ledger (i.e., write new key value pairs for the assets). The SDK may serve as a shim to package the transaction proposal into a properly architected format (e.g., protocol buffer over a remote procedure call (RPC)) and take the client's cryptographic credentials to produce a unique signature for the transaction proposal.

In response, the endorsing peer node 281 may verify (a) that the transaction proposal is well formed, (b) the transaction has not been submitted already in the past (replay-attack protection), (c) the signature is valid, and (d) that the submitter (client 260, in the example) is properly authorized to perform the proposed operation on that channel. The endorsing peer node 281 may take the transaction proposal inputs as arguments to the invoked chaincode function. The chaincode is then executed against a current state database to produce transaction results including a response value, read set, and write set. However, no updates are made to the ledger at this point. In 292, the set of values, along with the endorsing peer node's 281 signature is passed back as a proposal response 292 to the SDK of the client 260 which parses the payload for the application to consume.

In response, the application of the client 260 inspects/verifies the endorsing peers signatures and compares the proposal responses to determine if the proposal response is the same. If the chaincode only queried the ledger, the application would inspect the query response and would typically not submit the transaction to the ordering node service 284. If the client application intends to submit the transaction to the ordering node service 284 to update the ledger, the application determines if the specified endorsement policy has been fulfilled before submitting (i.e., did all peer nodes necessary for the transaction endorse the transaction). Here, the client may include only one of multiple parties to the transaction. In this case, each client may have their own endorsing node, and each endorsing node will need to endorse the transaction. The architecture is such that even if an application selects not to inspect responses or otherwise forwards an unendorsed transaction, the endorsement policy will still be enforced by peers and upheld at the commit validation phase.

After successful inspection, in step 293 the client 260 assembles endorsements into a transaction and broadcasts the transaction proposal and response within a transaction message to the ordering node 284. The transaction may contain the read/write sets, the endorsing peers signatures and a channel ID. The ordering node 284 does not need to inspect the entire content of a transaction in order to perform its operation, instead the ordering node 284 may simply receive transactions from all channels in the network, order them chronologically by channel, and create blocks of transactions per channel.

The blocks of the transaction are delivered from the ordering node 284 to all peer nodes 281-283 on the channel. The transactions 294 within the block are validated to ensure any endorsement policy is fulfilled and to ensure that there have been no changes to ledger state for read set variables since the read set was generated by the transaction execution. Transactions in the block are tagged as being valid or invalid. Furthermore, in step 295 each peer node 281-283 appends the block to the channel's chain, and for each valid transaction the write sets are committed to current state database. An event is emitted, to notify the client application that the transaction (invocation) has been immutably appended to the chain, as well as to notify whether the transaction was validated or invalidated.

Figure 3:
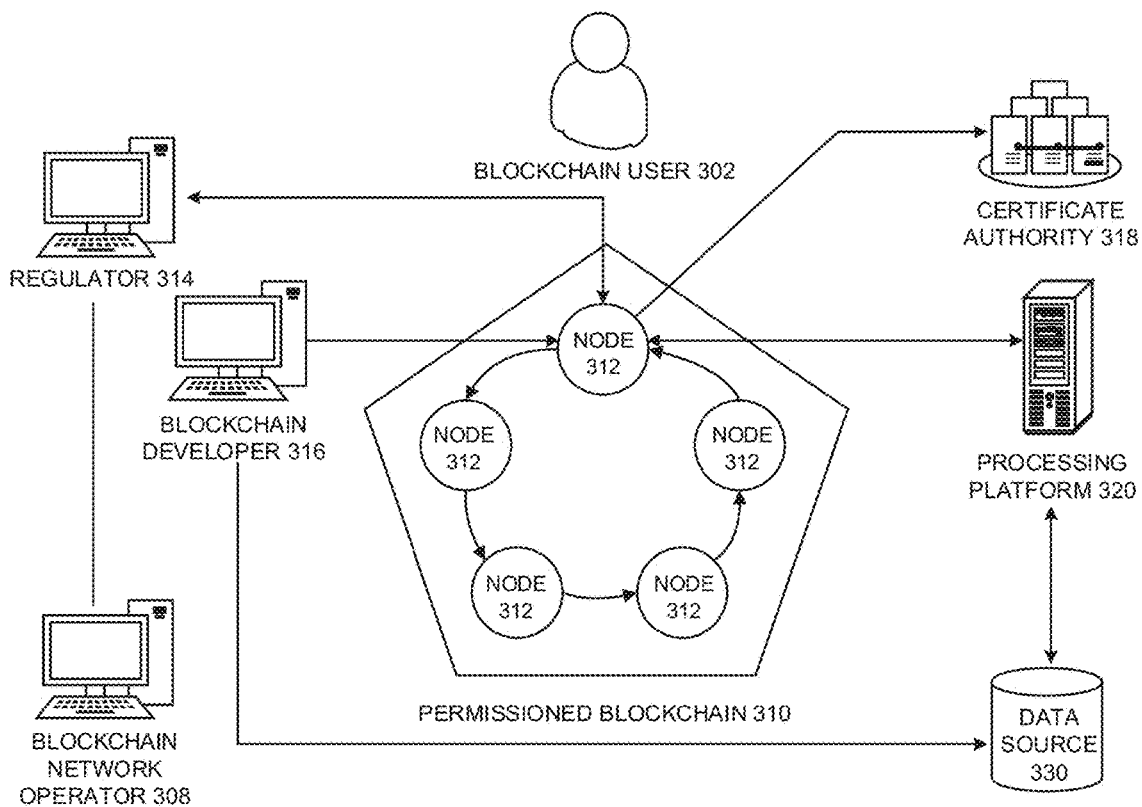
FIG. 3 illustrates a permissioned network, according to example embodiments.

FIG. 3 illustrates an example of a permissioned blockchain network 300, which features a distributed, decentralized peer-to-peer architecture, and a certificate authority 318 managing user roles and permissions. In this example, the blockchain user 302 may submit a transaction to the permissioned blockchain network 310. In this example, the transaction can be a deploy, invoke or query, and may be issued through a client-side application leveraging an SDK, directly through a REST API, or the like. Trusted business networks may provide access to regulator systems 314, such as auditors (the Securities and Exchange Commission in a U.S. equities market, for example). Meanwhile, a blockchain network operator system of nodes 308 manage member permissions, such as enrolling the regulator system 310 as an "auditor" and the blockchain user 302 as a "client." An auditor could be restricted only to querying the ledger whereas a client could be authorized to deploy, invoke, and query certain types of chaincode.

A blockchain developer system 316 writes chaincode and client-side applications. The blockchain developer system 316 can deploy chaincode directly to the network through a REST interface. To include credentials from a traditional data source 330 in chaincode, the developer system 316 could use an out-of-band connection to access the data. In this example, the blockchain user 302 connects to the network through a peer node 312. Before proceeding with any transactions, the peer node 312 retrieves the user's enrollment and transaction certificates from the certificate authority 318. In some cases, blockchain users must possess these digital certificates in order to transact on the permissioned blockchain network 310. Meanwhile, a user attempting to drive chaincode may be required to verify their credentials on the traditional data source 330. To confirm the user's authorization, chaincode can use an out-of-band connection to this data through a traditional processing platform 320.

Figure 4:
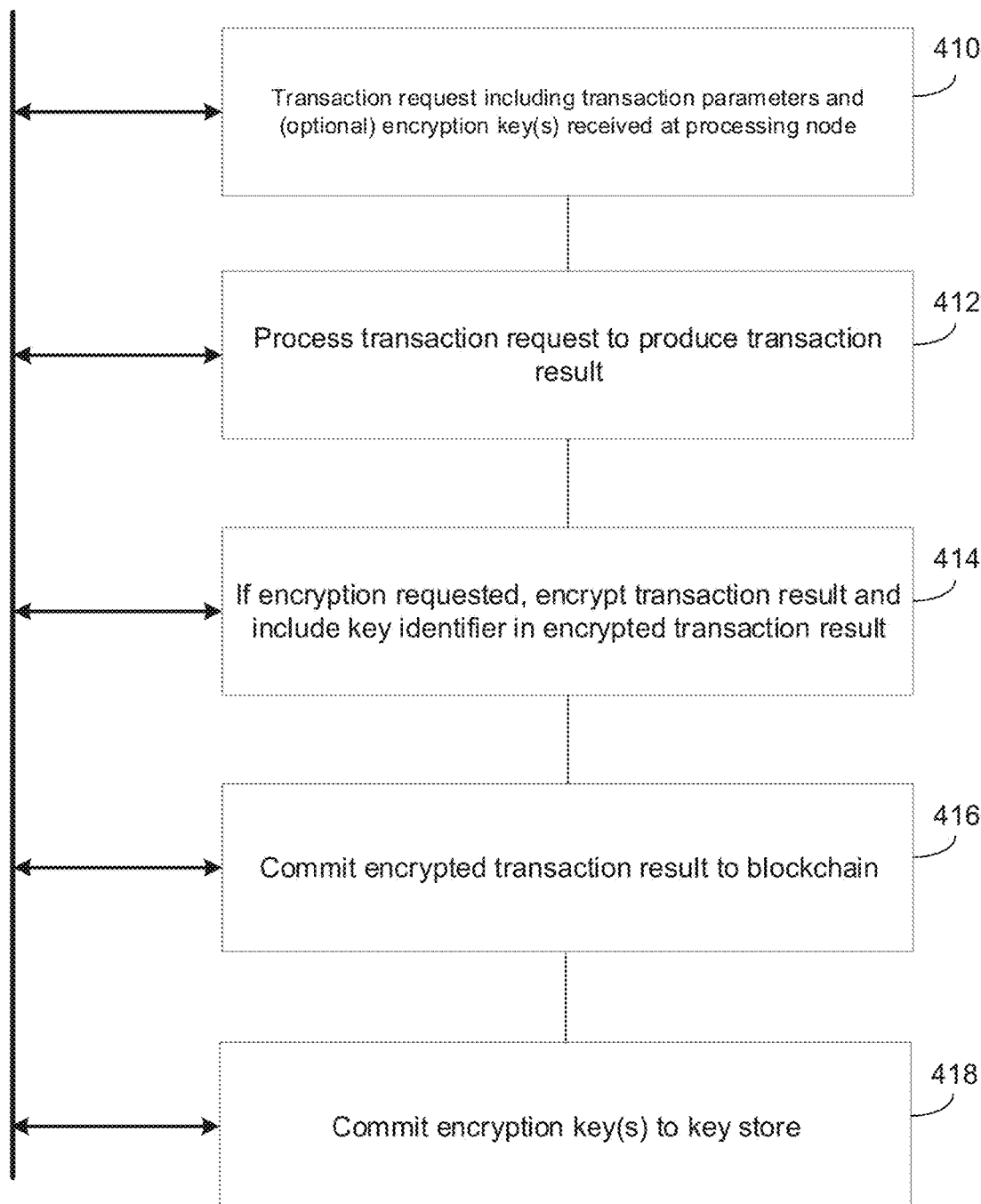
FIG. 4 illustrates a flow diagram of a method for encrypting transaction data on a ledger, according to example embodiments.

FIG. 4 shows a process 400 for providing a right to be forgotten protocol on a blockchain. The client (user) submits a transaction including transaction parameters such as one or more key/value pairs. The transaction request is received into a processing node 102 of the network 100 at step 410. If the client has decided to implement the right-to-be-forgotten protocol, the client may include one or more encryption keys with the transaction parameters. The encryption key may be specific to a transaction, a cluster of transactions or the user. After running chaincode to implement the transaction (step 412), the content of the transaction is encrypted with the encryption key (step 414). The encrypted transaction, including an encryption key identifier, may then be committed to the blockchain 416 and the key store updated with the encryption key 418.

If, at a later time, a piece of data is requested to be forgotten on the blockchain, the encryption key needed to decrypt the data is removed from the blockchain platform's key store, at which time, the data is functionally forgotten.

The encryption key is provided as part of a transaction proposal by the client along with other transaction parameters. The key is used to encrypt the content of the transaction, specifically the result of execution of chaincode. In one embodiment, it is only the value(s) of a key/value pair(s) of the transaction that are encrypted. The parameter keys may remain unencrypted. In alternative embodiments, both the key and the value may be encrypted. The encrypted transaction contains an identifier of the encryption key(s) used for encryption/decryption to enable the relevant keys to be retrieved from the key store.

Figure 5A:
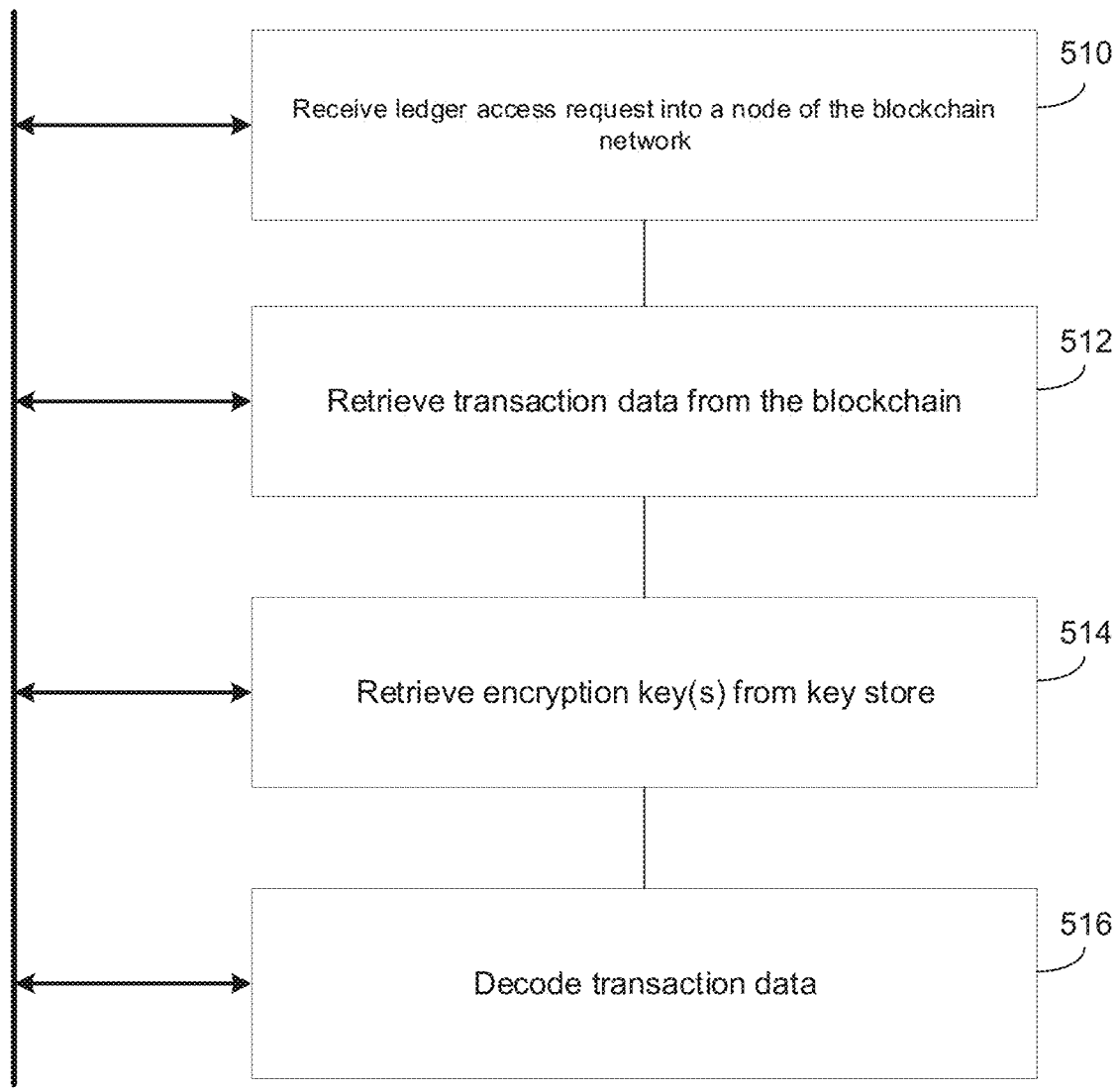
FIG. 5A illustrates a flow diagram for retrieving transaction data, according to example embodiments.

FIG. 5A illustrates a process 500 for reading data from the ledger/blockchain. At step 510, a data request is received into a node 102 of the blockchain network 100. The node retrieves the transaction data from the blockchain (step 512). If the retrieved transaction data includes one or more encryption key identifiers, then the key store is accessed to retrieve the key(s) 514, if present in the key store. If the key request is successful, then the transaction data may be decrypted 516.

When a transaction is read from the ledger, the transaction query result indicates if any keys are required to process the transaction. If the data is unencrypted, then the ledger query may return an empty encryption field. A non-empty encryption key field of the query result will indicate that decoding of the transaction data is required. In one embodiment, a query result to a query on the ledger will return a key/value pair, with the value being encrypted. The query result also returns an identifier for the encryption key required to decrypt the value. From the query result, a call may be made to the key store for the relevant key to decrypt the content. If the encryption key is present in the Key-store, the content can be decrypted. Decoding of the transaction data may be performed at the node 102. Alternatively, the query result returned to the requesting entity may include the encrypted data and the key(s) required for decoding to enable decoding to be performed at the client side.

If the data is encrypted but the call to the key store returns no result, then the key has been deleted from the key store. The content therefore remains encrypted and thus functionally forgotten. At this point, the ledger is un-modified, yet the data is forgotten. There may still be a trace on the ledger about who and when executed the transaction in the form of a timestamp and transaction certificate signature which may be traceable back to an enrollment certificate. However, the particulars of the transaction will remain hidden.

The encryption key is owned and controlled by the client. In various embodiments, both secret key or public/private key systems may be employed. The key can be unique to a transaction, in a similar manner to transaction certificate (tcert). Alternatively, the key may be unique to a participant, in a similar manner to an enrollment certificate (ecert). Alternatively, the client may implement their own key management schema and provide a key of choice for the transaction. Clusters of transactions may thus be associated with a specific key.

The participant can manage the persistence of their data on the blockchain by controlling the persistence of their various encryption keys within the platform key store. To forget all of their data, the participant may request that the key store drop or delete the participant encryption key. To forget a specific transaction, the participant may request that a transaction specific encryption key is deleted from the key store. To forget a cluster a transactions, a specific key pertaining to the cluster can be deleted from the key store.

In one embodiment, the system may allow a user to encrypt a transaction multiple times with multiple keys. For example, a user might not know, at the time of the transaction, if they want a Participant Key, or a Transaction Key to apply to a transaction. If at a later time, the user wants to delete a specific transaction that is encrypted only with the Participant Key, they will not be able to forget this transaction without deleting the other transactions encrypted with the Participant Key. By encrypting a transaction with multiple keys, e.g. a Participant Key and a Transaction Key, then the user can decide later how to delete that transaction.

The interface by which the user generates and submits transactions may provide a means to allow the user to select which, if any, encryption keys should apply to a transaction. The transaction will reference the encryption keys and an indication of the order in which they should be applied for encrypting and decrypting the data.

The interface may allow the user to select different encryption keys and different combinations of encryption keys for different aspects of a transaction, i.e. different key/value pairs.

A copy of the key store is maintained by every node on the blockchain platform that also stores the ledger. The key store contains all of the active keys related to all transactions on the ledger. Requests to delete a key may submitted in a similar manner to transaction requests. That is, the request to delete a key is transmitted by a client to a first node of the network and that node causes the request to be broadcast to all nodes using the implemented communication protocols of the blockchain platform. Each node, upon receiving the deletion request, permanently deletes the encryption keys from the node's local copy of the key store.

Security and authentication protocols may be implemented for ensuring the validity of a deletion request.

Figure 5B:
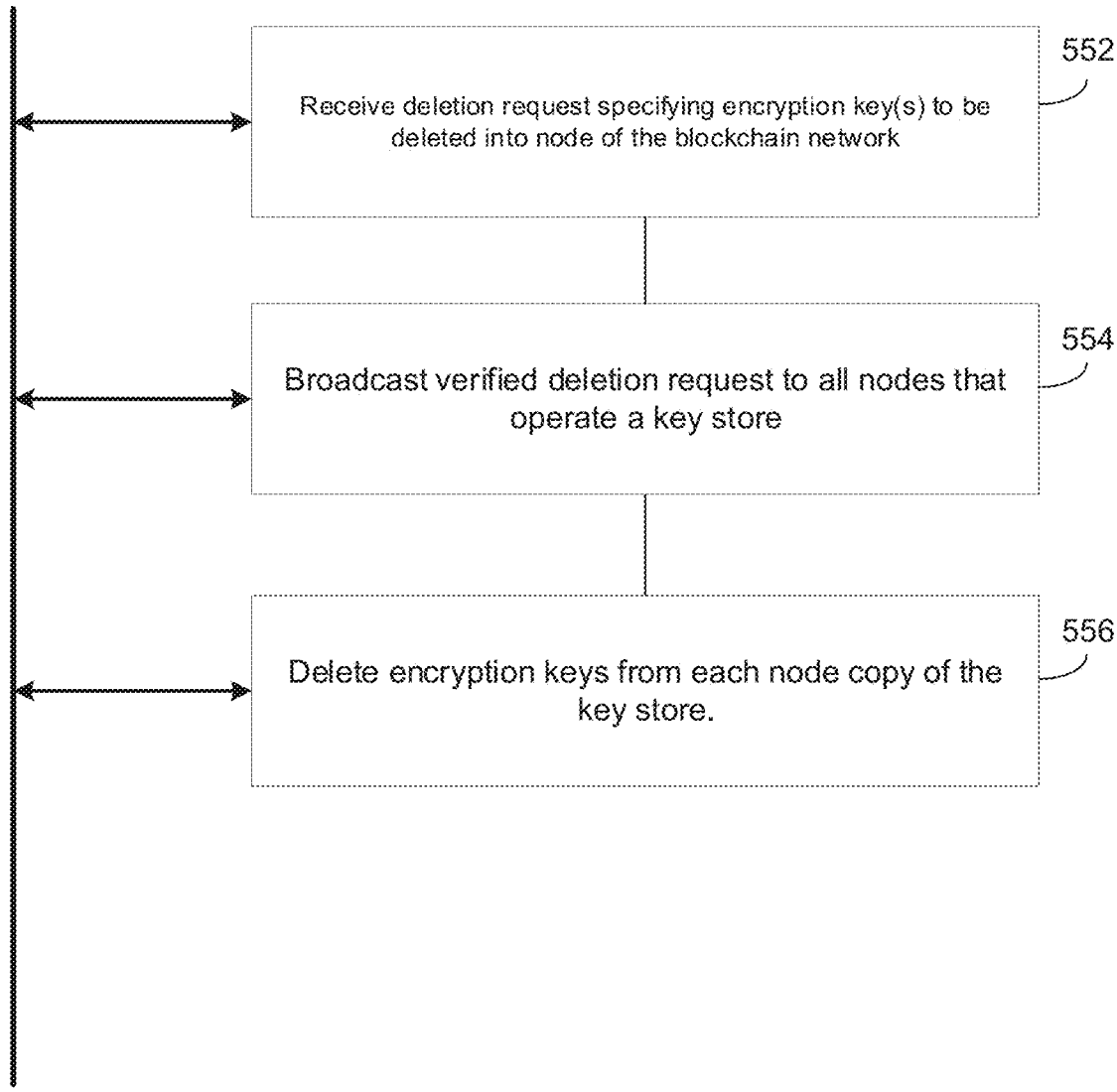
FIG. 5B illustrates a flow diagram for deleting encryption keys, according to example embodiments.

FIG. 5B shows a process 550 for handling encryption key deletion requests. At step 552, a node 102 of the blockchain network receives a deletion request specifying one or more encryption keys to be deleted from the encryption key store. The deletion request may be verified and then broadcast to all nodes 102 of the blockchain network 100 (step 554). Each node 102 that operates a key store will then delete the encryption key(s) in the deletion request from their local copy of the key store 556.

When a new node or peer joins the network, and/or when recovering from a failure, the node will request a copy of the ledger. As part of the retrieving the world state of the ledger, the node also receives a copy of all active keys related to the ledger and generates a local key-store.

The clients may manage their encryption keys in any suitable manner. Management of the keys by the client is not considered pertinent to the implement of the embodiments described herein.

Figure 6A:
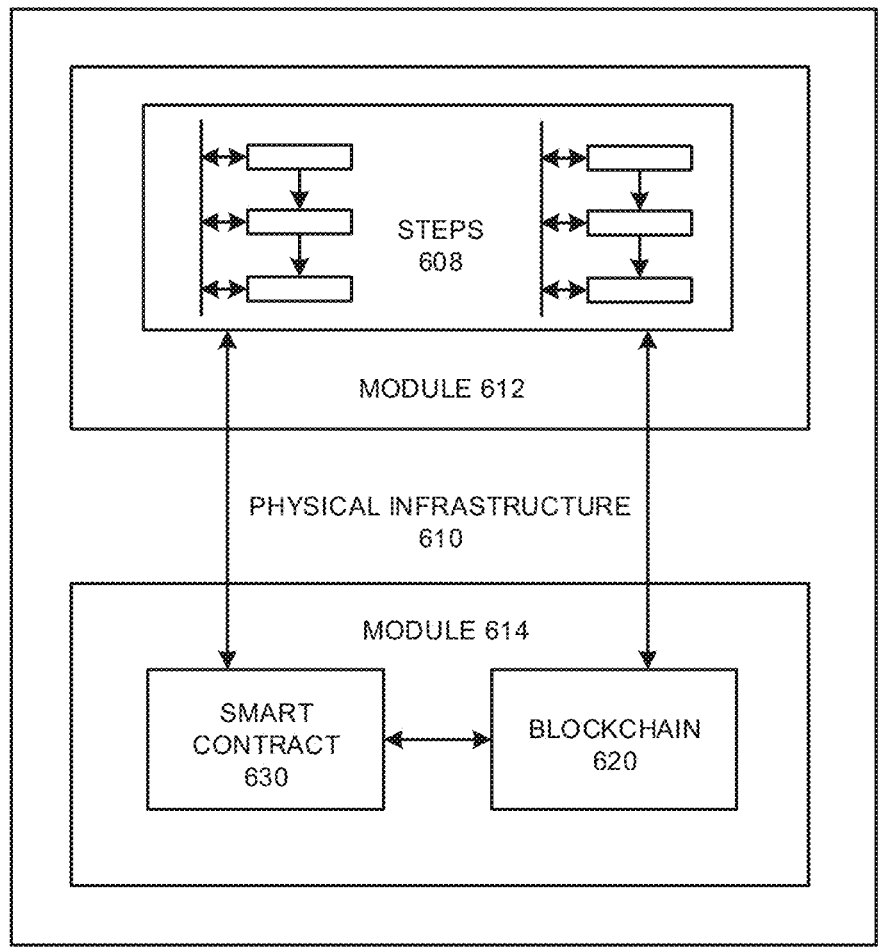
FIG. 6A illustrates an example system configured to perform one or more operations described herein, according to example embodiments.

FIG. 6A illustrates an example system 600 that includes a physical infrastructure 610 configured to perform various operations according to example embodiments. Referring to FIG. 6A, the physical infrastructure 610 includes a module 612 and a module 614. The module 614 includes a blockchain 620 and a smart contract 630 (which may reside on the blockchain 620), that may execute any of the operational steps 608 (in module 612) included in any of the example embodiments. The steps/operations 608 may include one or more of the embodiments described or depicted and may represent output or written information that is written or read from one or more smart contracts 630 and/or blockchains 620. The physical infrastructure 610, the module 612, and the module 614 may include one or more computers, servers, processors, memories, and/or wireless communication devices. Further, the module 612 and the module 614 may be a same module.

Figure 6B:
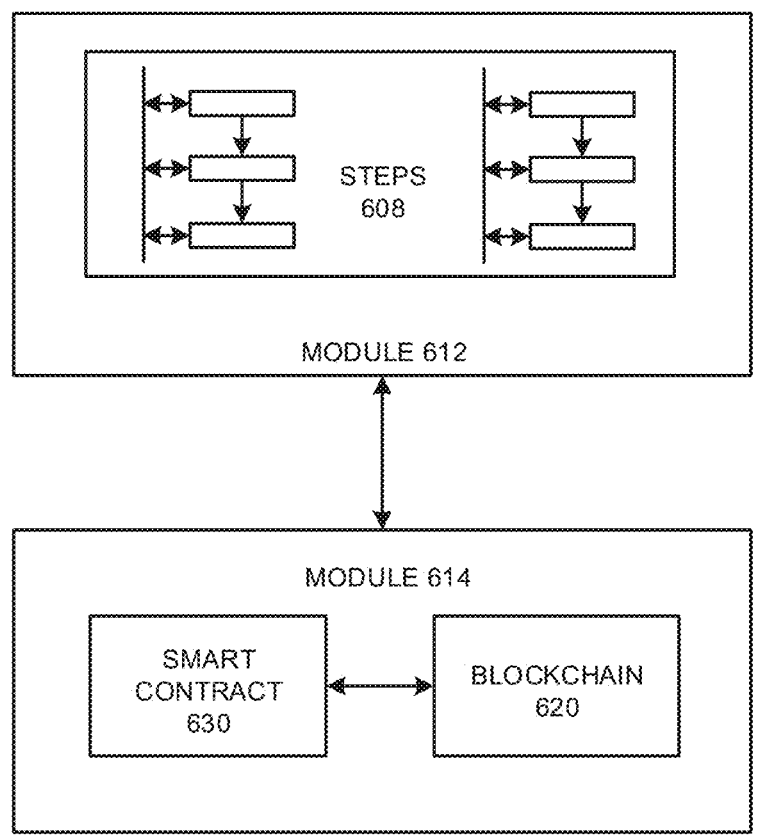
FIG. 6B illustrates a further example system configured to perform one or more operations described herein, according to example embodiments.

FIG. 6B illustrates an example system 640 configured to perform various operations according to example embodiments. Referring to FIG. 6B, the system 640 includes a module 612 and a module 614. The module 614 includes a blockchain 620 and a smart contract 630 (which may reside on the blockchain 620), that may execute any of the operational steps 608 (in module 612) included in any of the example embodiments. The steps/operations 608 may include one or more of the embodiments described or depicted and may represent output or written information that is written or read from one or more smart contracts 630 and/or blockchains 620. The physical infrastructure 610, the module 612, and the module 614 may include one or more computers, servers, processors, memories, and/or wireless communication devices. Further, the module 612 and the module 614 may be a same module.

Figure 6C:
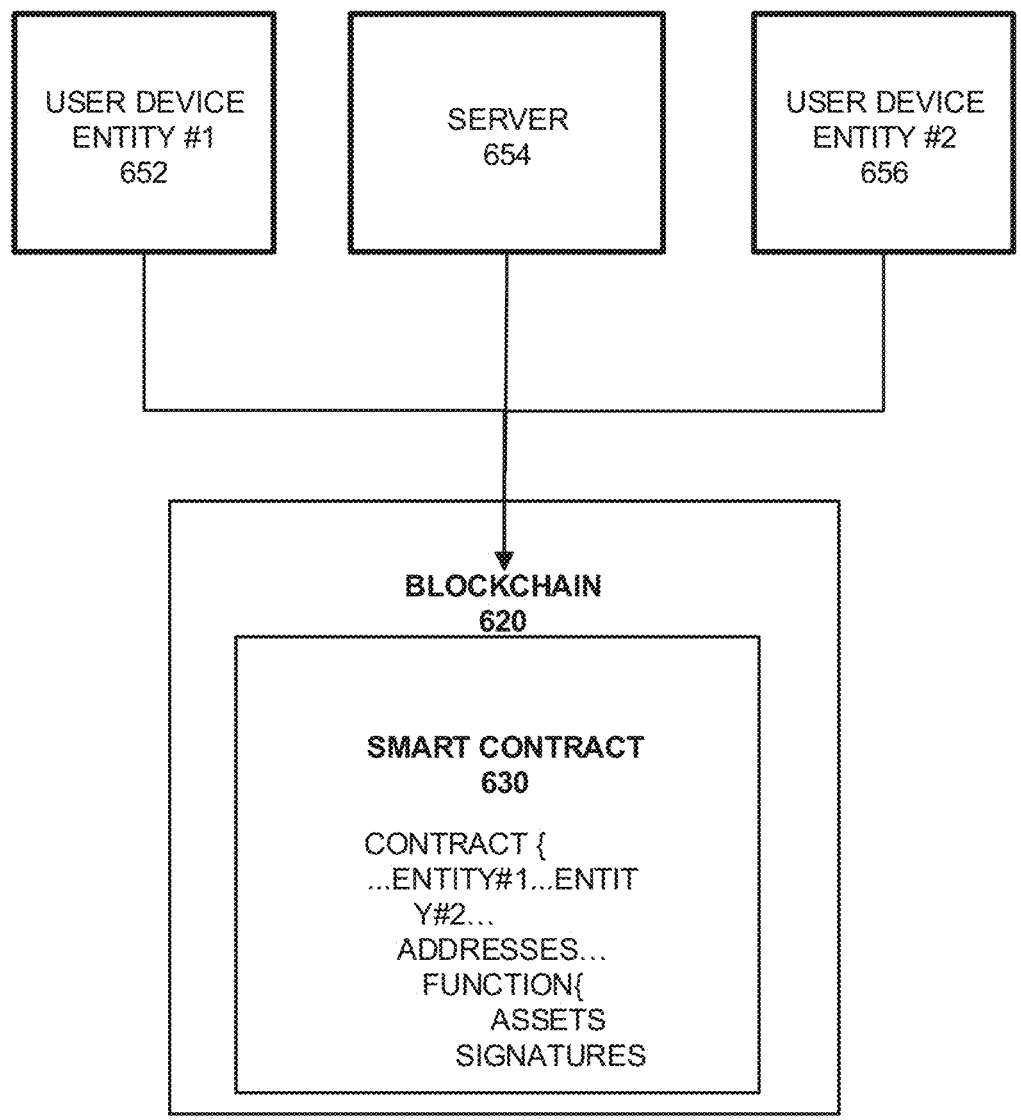
FIG. 6C illustrates a smart contract configuration among contracting parties and a mediating server configured to enforce the smart contract terms on the blockchain according to example embodiments.

FIG. 6C illustrates an example smart contract configuration among contracting parties and a mediating server configured to enforce the smart contract terms on the blockchain according to example embodiments. Referring to FIG. 6C, the configuration 650 may represent a communication session, an asset transfer session or a process or procedure that is driven by a smart contract 630 which explicitly identifies one or more user devices 652 and/or 656. The execution, operations and results of the smart contract execution may be managed by a server 654. Content of the smart contract 630 may require digital signatures by one or more of the entities 652 and 656 which are parties to the smart contract transaction. The results of the smart contract execution may be written to a blockchain 620 as a blockchain transaction. The smart contract 630 resides on the blockchain 620 which may reside on one or more computers, servers, processors, memories, and/or wireless communication devices.

Figure 6D:
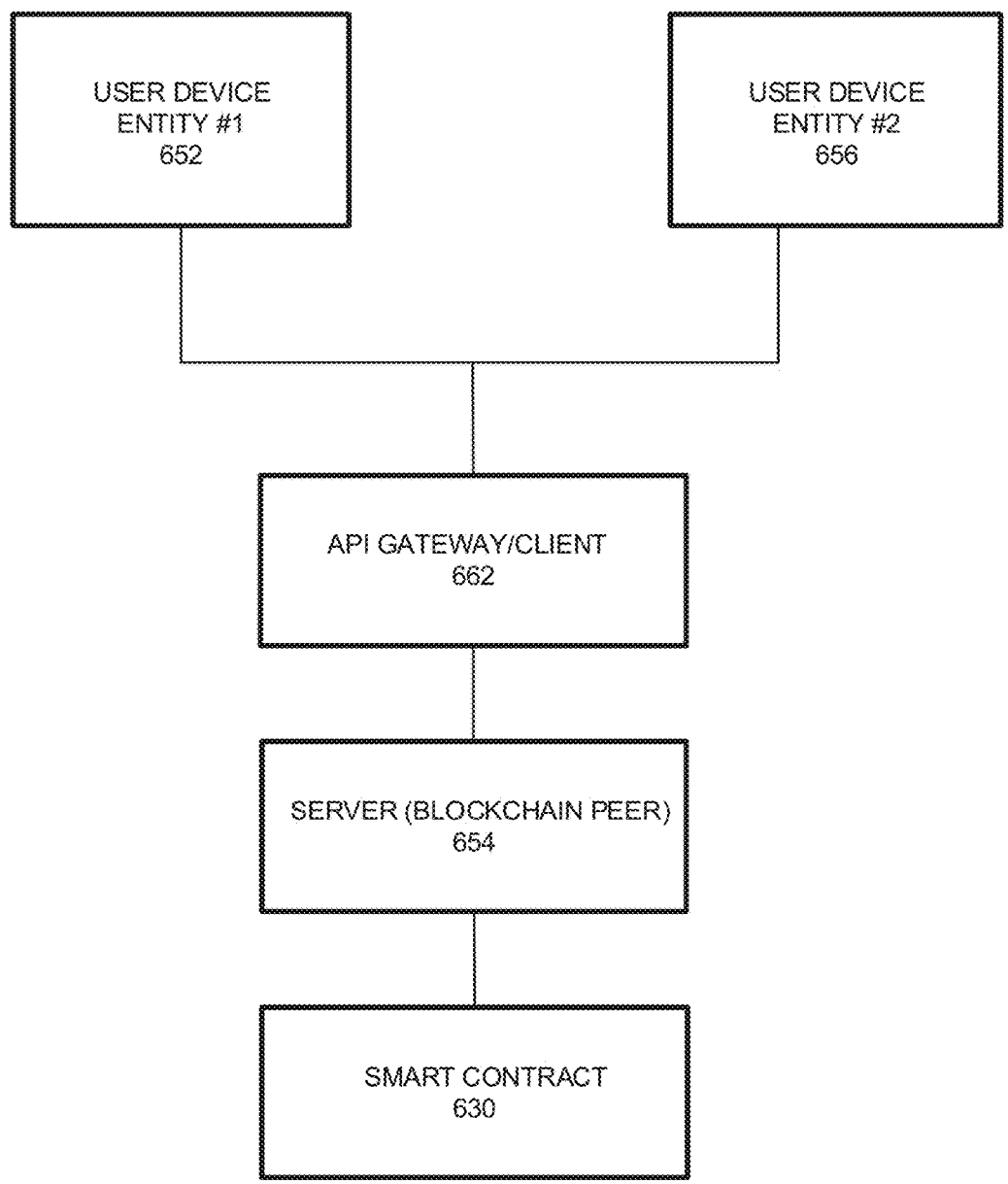
FIG. 6D illustrates another an additional example system, according to example embodiments.

FIG. 6D illustrates a common interface for accessing logic 660 and data of a blockchain, according to example embodiments. Referring to the example of FIG. 6D, an application programming interface (API) gateway 662 provides a common interface for accessing blockchain logic (e.g., smart contract 630 or other chaincode) and data (e.g., distributed ledger, etc.) In this example, the API gateway 662 is a common interface for performing transactions (invoke, queries, etc.) on the blockchain by connecting one or more entities 652 and 656 to a blockchain peer (i.e., server 654). Here, the server 654 is a blockchain network peer component that holds a copy of the world state and a distributed ledger allowing clients 652 and 656 to query data on the world state as well as submit transactions into the blockchain network where, depending on the smart contract 630 and endorsement policy, endorsing peers will run the smart contracts 630.

The above embodiments may be implemented in hardware, in a computer program executed by a processor, in firmware, or in a combination of the above. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example, FIG. 7 illustrates an example computer system architecture 700, which may represent or be integrated in any of the above-described components, etc.

Figure 7A:
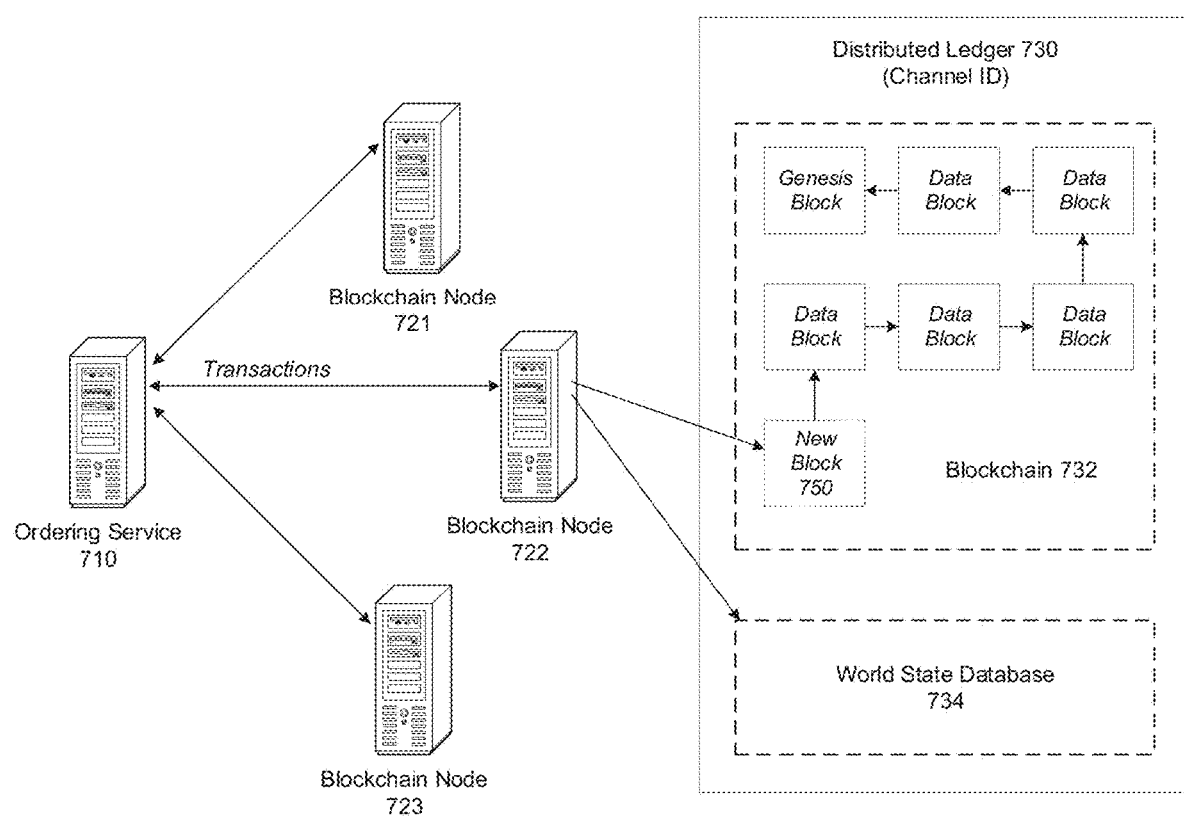
FIG. 7A illustrates a process of new data being added to a database, according to example embodiments.
Figure 7B:
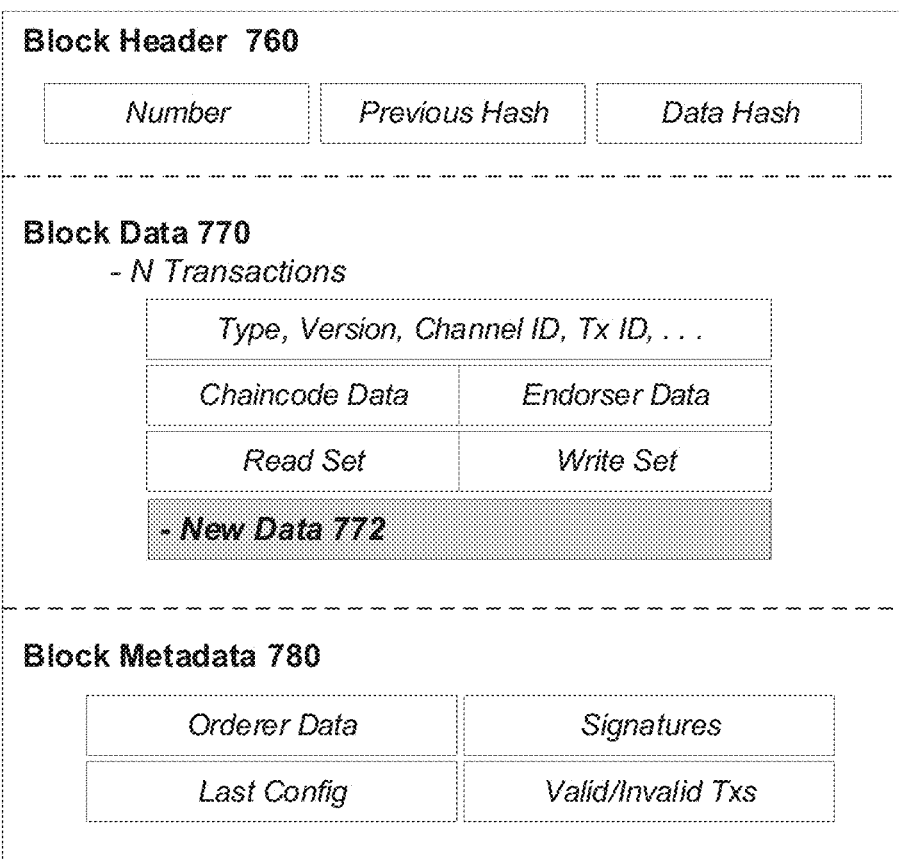
FIG. 7B illustrates contents a data block including the new data, according to example embodiments.

FIG. 7A illustrates a process 700 of a new block being added to a distributed ledger 730, according to example embodiments, and FIG. 7B illustrates contents of a block structure 750 for blockchain, according to example embodiments. Referring to FIG. 7A, clients (not shown) may submit transactions to blockchain nodes 721, 722, and/or 723. Clients may be instructions received from any source to enact activity on the blockchain 730. As an example, clients may be applications that act on behalf of a requester, such as a device, person or entity to propose transactions for the blockchain. The plurality of blockchain peers (e.g., blockchain nodes 721, 722, and 723) may maintain a state of the blockchain network and a copy of the distributed ledger 730. Different types of blockchain nodes/peers may be present in the blockchain network including endorsing peers which simulate and endorse transactions proposed by clients and committing peers which verify endorsements, validate transactions, and commit transactions to the distributed ledger 730. In this example, the blockchain nodes 721, 722, and 723 may perform the role of endorser node, committer node, or both.

The distributed ledger 730 includes a blockchain 732 which stores immutable, sequenced records in blocks, and a state database 734 (current world state) maintaining a current state of the blockchain 732. One distributed ledger 730 may exist per channel and each peer maintains its own copy of the distributed ledger 730 for each channel of which they are a member. The blockchain 732 is a transaction log, structured as hash-linked blocks where each block contains a sequence of N transactions. Blocks may include various components such as shown in FIG. 7B. The linking of the blocks (shown by arrows in FIG. 7A) may be generated by adding a hash of a prior block's header within a block header of a current block. In this way, all transactions on the blockchain 732 are sequenced and cryptographically linked together preventing tampering with blockchain data without breaking the hash links. Furthermore, because of the links, the latest block in the blockchain 732 represents every transaction that has come before it. The blockchain 732 may be stored on a peer file system (local or attached storage), which supports an append-only blockchain workload.

The current state of the blockchain 732 and the distributed ledger 732 may be stored in the state database 734. Here, the current state data represents the latest values for all keys ever included in the chain transaction log of the blockchain 732. Chaincode invocations execute transactions against the current state in the state database 734. To make these chaincode interactions extremely efficient, the latest values of all keys are stored in the state database 734. The state database 734 may include an indexed view into the transaction log of the blockchain 732, it can therefore be regenerated from the chain at any time. The state database 734 may automatically get recovered (or generated if needed) upon peer startup, before transactions are accepted.

Endorsing nodes receive transactions from clients and endorse the transaction based on simulated results. Endorsing nodes hold smart contracts which simulate the transaction proposals. When an endorsing node endorses a transaction, the endorsing nodes creates a transaction endorsement which is a signed response from the endorsing node to the client application indicating the endorsement of the simulated transaction. The method of endorsing a transaction depends on an endorsement policy which may be specified within chaincode. An example of an endorsement policy is "the majority of endorsing peers must endorse the transaction." Different channels may have different endorsement policies. Endorsed transactions are forward by the client application to ordering service 710.

The ordering service 710 accepts endorsed transactions, orders them into a block, and delivers the blocks to the committing peers. For example, the ordering service 710 may initiate a new block when a threshold of transactions has been reached, a timer times out, or another condition. In the example of FIG. 7A, blockchain node 722 is a committing peer that has received a new data block 750 for storage on blockchain 730.

The ordering service 710 may be made up of a cluster of orderers. The ordering service 710 does not process transactions, smart contracts, or maintain the shared ledger. Rather, the ordering service 710 may accept the endorsed transactions and specifies the order in which those transactions are committed to the distributed ledger 730. The architecture of the blockchain network may be designed such that the specific implementation of 'ordering' (e.g., Solo, Kafka, BFT, etc.) becomes a pluggable component.

Transactions are written to the distributed ledger 730 in a consistent order. The order of transactions is established to ensure that the updates to the state database 734 are valid when they are committed to the network. Unlike a cryptocurrency blockchain system (e.g., Bitcoin, etc.) where ordering occurs through the solving of a cryptographic puzzle, or mining, in this example the parties of the distributed ledger 730 may choose the ordering mechanism that best suits that network.

When the ordering service 710 initializes a new block 750, the new block 750 may be broadcast to committing peers (e.g., blockchain nodes 721, 722, and 723). In response, each committing peer validates the transaction within the new block 750 by checking to make sure that the read set and the write set still match the current world state in the state database 734. Specifically, the committing peer can determine whether the read data that existed when the endorsers simulated the transaction is identical to the current world state in the state database 734. When the committing peer validates the transaction, the transaction is written to the blockchain 732 on the distributed ledger 730, and the state database 734 is updated with the write data from the read-write set. If a transaction fails, that is, if the committing peer finds that the read-write set does not match the current world state in the state database 734, the transaction ordered into a block will still be included in that block, but it will be marked as invalid, and the state database 734 will not be updated.

Referring to FIG. 7B, a block 750 (also referred to as a data block) that is stored on the blockchain 732 of the distributed ledger 730 may include multiple data segments such as a block header 760, block data 770, and block metadata 780. It should be appreciated that the various depicted blocks and their contents, such as block 750 and its contents. shown in FIG. 7B are merely for purposes of example and are not meant to limit the scope of the example embodiments. In some cases, both the block header 760 and the block metadata 780 may be smaller than the block data 770 which stores transaction data, however this is not a requirement. The block 750 may store transactional information of N transactions (e.g., 100, 500, 1000, 2000, 3000, etc.) within the block data 770. The block 750 may also include a link to a previous block (e.g., on the blockchain 732 in FIG. 7A) within the block header 760. In particular, the block header 760 may include a hash of a previous block's header. The block header 760 may also include a unique block number, a hash of the block data 770 of the current block 750, and the like. The block number of the block 750 may be unique and assigned in an incremental/sequential order starting from zero. The first block in the blockchain may be referred to as a genesis block which includes information about the blockchain, its members, the data stored therein, etc.

The block data 770 may store transactional information of each transaction that is recorded within the block 750. For example, the transaction data may include one or more of a type of the transaction, a version, a timestamp, a channel ID of the distributed ledger 730, a transaction ID, an epoch, a payload visibility, a chaincode path (deploy tx), a chaincode name, a chaincode version, input (chaincode and functions), a client (creator) identify such as a public key and certificate, a signature of the client, identities of endorsers, endorser signatures, a proposal hash, chaincode events, response status, namespace, a read set (list of key and version read by the transaction, etc.), a write set (list of key and value, etc.), a start key, an end key, a list of keys, a Merkel tree query summary, and the like. The transaction data may be stored for each of the N transactions.

In some embodiments, the block data 770 may also store data 772 which adds additional information to the hash-linked chain of blocks in the blockchain 732. Accordingly, the data 772 can be stored in an immutable log of blocks on the distributed ledger 730. Some of the benefits of storing such data 772 are reflected in the various embodiments disclosed and depicted herein.

The block metadata 780 may store multiple fields of metadata (e.g., as a byte array, etc.). Metadata fields may include signature on block creation, a reference to a last configuration block, a transaction filter identifying valid and invalid transactions within the block, last offset persisted of an ordering service that ordered the block, and the like. The signature, the last configuration block, and the orderer metadata may be added by the ordering service 710. Meanwhile, a committer of the block (such as blockchain node 722) may add validity/invalidity information based on an endorsement policy, verification of read/write sets, and the like. The transaction filter may include a byte array of a size equal to the number of transactions in the block data 770 and a validation code identifying whether a transaction was valid/invalid.

Figure 8:
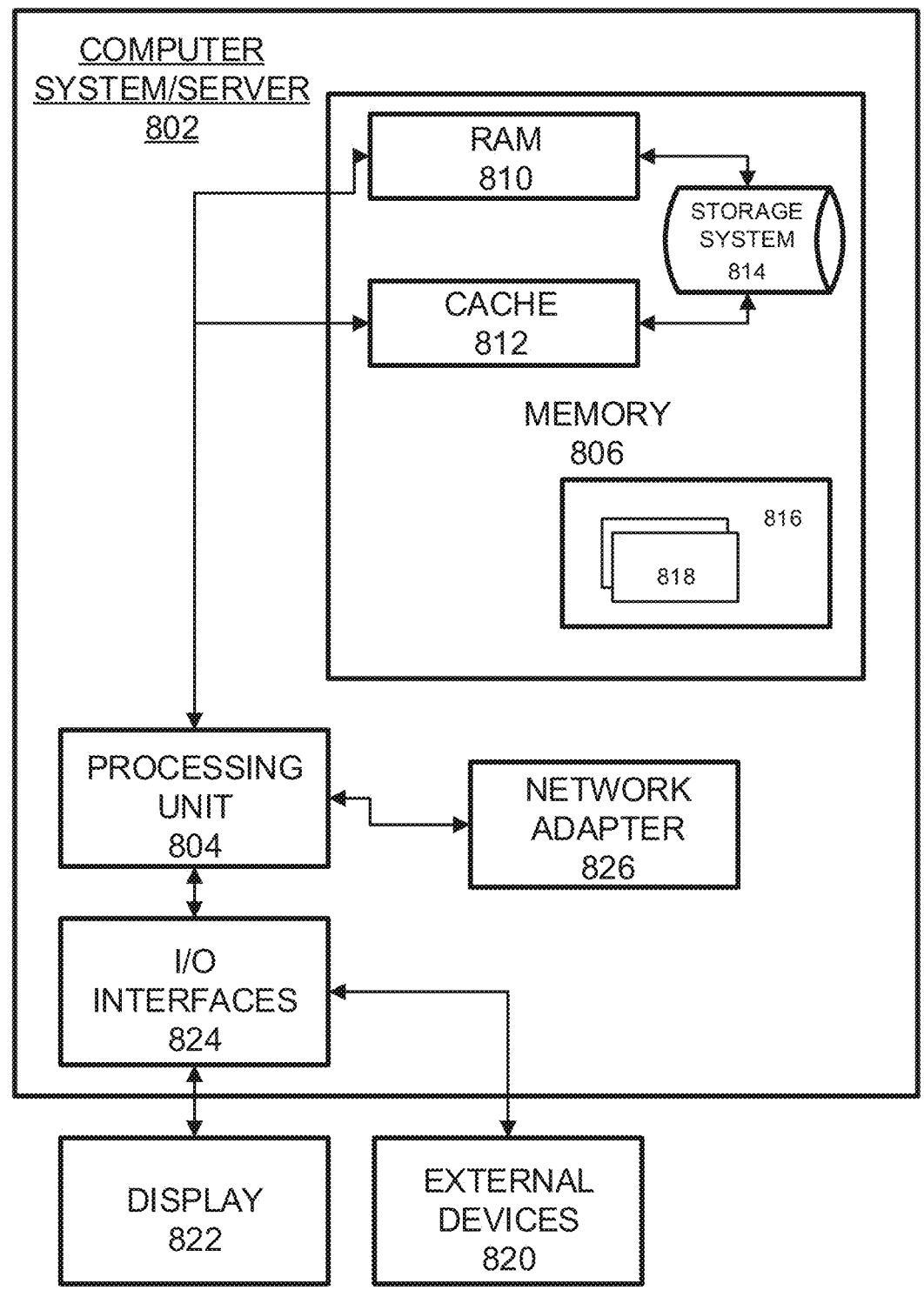
FIG. 8 illustrates an example system that supports one or more of the example embodiments.

FIG. 8 is not intended to suggest any limitation as to the scope of use or functionality of embodiments of the application described herein. Regardless, the computing node 800 is capable of being implemented and/or performing any of the functionality set forth hereinabove.

In computing node 800 there is a computer system/server 802, which is operational with numerous other general purpose or special purpose computing system environments or configurations. Examples of well-known computing systems, environments, and/or configurations that may be suitable for use with computer system/server 802 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 802 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 802 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 8, computer system/server 802 in cloud computing node 800 is shown in the form of a general-purpose computing device. The components of computer system/server 802 may include, but are not limited to, one or more processors or processing units 804, a system memory 806, and a bus that couples various system components including system memory 806 to processor 804.

The bus represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 802 typically includes a variety of computer system readable media. Such media may be any available media that is accessible by computer system/server 802, and it includes both volatile and non-volatile media, removable and non-removable media. System memory 806, in one embodiment, implements the flow diagrams of the other figures. The system memory 806 can include computer system readable media in the form of volatile memory, such as random-access memory (RAM) 810 and/or cache memory 812. Computer system/server 802 may further include other removable/non-removable, volatile/non-volatile computer system storage media. By way of example only, storage system 814 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus by one or more data media interfaces. As will be further depicted and described below, memory 806 may include at least one program product having a set (e.g., at least one) of program modules that are configured to carry out the functions of various embodiments of the application.

Program/utility 816, having a set (at least one) of program modules 818, may be stored in memory 806 by way of example, and not limitation, as well as an operating system, one or more application programs, other program modules, and program data. Each of the operating system, one or more application programs, other program modules, and program data or some combination thereof, may include an implementation of a networking environment. Program modules 818 generally carry out the functions and/or methodologies of various embodiments of the application as described herein.

As will be appreciated by one skilled in the art, aspects of the present application may be embodied as a system, method, or computer program product. Accordingly, aspects of the present application may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present application may take the form of a computer program product embodied in one or more computer readable medium(s) having computer readable program code embodied thereon.

Computer system/server 802 may also communicate with one or more external devices 820 such as a keyboard, a pointing device, a display 822, etc.; one or more devices that enable a user to interact with computer system/server 802; and/or any devices (e.g., network card, modem, etc.) that enable computer system/server 802 to communicate with one or more other computing devices. Such communication can occur via I/O interfaces 824. Still yet, computer system/server 802 can communicate with one or more networks such as a local area network (LAN), a general wide area network (WAN), and/or a public network (e.g., the Internet) via network adapter 826. As depicted, network adapter 826 communicates with the other components of computer system/server 802 via a bus. It should be understood that although not shown, other hardware and/or software components could be used in conjunction with computer system/server 802. Examples, include, but are not limited to: microcode, device drivers, redundant processing units, external disk drive arrays, RAID systems, tape drives, and data archival storage systems, etc.

Although an exemplary embodiment of at least one of a system, method, and non-transitory computer readable medium has been illustrated in the accompanied drawings and described in the foregoing detailed description, it will be understood that the application is not limited to the embodiments disclosed, but is capable of numerous rearrangements, modifications, and substitutions as set forth and defined by the following claims. For example, the capabilities of the system of the various figures can be performed by one or more of the modules or components described herein or in a distributed architecture and may include a transmitter, receiver or pair of both. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way but is intended to provide one example of many embodiments. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed but is merely representative of selected embodiments of the application.

One having ordinary skill in the art will readily understand that the above may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

What is claimed is:

1. A system, comprising:
a plurality of blockchain peer nodes programmed to store transaction data in a blockchain; and
wherein one or more of the blockchain peer nodes comprises a hardware processor configured to:
receive a transaction request comprising one or more transaction parameters and an encryption key;
process the transaction request to produce a transaction result;
encrypt one or more parameters of the transaction result with the encryption key to produce an encrypted transaction result;
store the encrypted transaction result in a data block of a blockchain;
store the encryption key in a local encryption key store; and
delete the encryption key from the local encryption key store in response to a request and transmit a deletion request to delete the encryption key to other blockchain peer nodes among the plurality of blockchain peer nodes.

2. The system of claim 1 wherein each of the blockchain peer nodes comprises a local encryption key store.

3. The system of claim 1, wherein the request comprises a deletion request from a user of the encryption key, and the processor is configured to transmit the received deletion request to the other blockchain peer nodes.

4. The system of claim 1 wherein the processor is configured to:
receive a transaction data request;
retrieve transaction data from the blockchain that pertains to the transaction data request;
determine from the transaction data one or more encryption keys required to decrypt one or more parameters of the transaction data; and
retrieve the required one or more encryption keys from the local encryption key store.

5. The system of claim 1 wherein the processor is configured to encrypt a value of one or more key/value pairs using the encryption key and not encrypt a corresponding key of the one or more key/value pairs.

6. The system of claim 1 wherein the encrypted transaction result comprises an encryption key identifier that identifies the encryption key required to decrypt the encrypted transaction result.

7. A method, comprising:
receiving a transaction request comprising one or more transaction parameters and an encryption key;
processing the transaction request to produce a transaction result;
encrypting one or more parameters of the transaction result with the encryption key to produce an encrypted transaction result;
storing the encrypted transaction result in a data block of a blockchain that is managed by a plurality of blockchain peer nodes;
storing the encryption key in a local encryption key store; and
deleting the encryption key from the local encryption key store in response to a request and transmitting a deletion request to delete the encryption key to other blockchain peer nodes among the plurality of blockchain peer nodes.

8. The method of claim 7, wherein each of the blockchain peer nodes comprises a respective local encryption key store.

9. The method of claim 7, further comprising broadcasting the data block and the encryption key to the plurality of blockchain peer nodes.

10. The method of claim 7, wherein the transaction request comprises a deletion request from a user, and the method further comprises transmitting the received deletion request to the other blockchain peer nodes.

11. The method of claim 10, wherein the deletion request identifies one or more encryption keys to be deleted from the local encryption key store.

12. The method of claim 7, further comprising broadcasting the encryption key to the plurality of blockchain peer nodes.

13. The method of claim 7, wherein the storing the encrypted transaction result comprises storing an identifier of the encryption key in the encrypted transaction result that identifies the encryption key required to decrypt the encrypted transaction result.

14. The method of claim 7, further comprising:
receiving a transaction data request at a node of the blockchain;
retrieving transaction data from a blockchain pertaining to the transaction request;
determining from the transaction data one or more encryption keys required to decrypt one or more parameters of the transaction data;
retrieving the one or more encryption keys from the local encryption key store;
decrypting the transaction data using the one or more retrieved encryption keys; and
deleting the one or more encryption keys from the local encryption key store in response to a request.

15. The method of claim 7, wherein the encrypting comprises encrypting a value of one or more key/value pairs and not encrypting a corresponding key of the one or more key/value pairs.

16. A non-transitory computer readable medium comprising instructions, that when read by a processor, cause the processor to perform a method comprising:
- receiving a transaction request comprising one or more transaction parameters and an encryption key;
- processing the transaction request to produce a transaction result;
- encrypting one or more parameters of the transaction result with the encryption key to produce an encrypted transaction result;
- storing the encrypted transaction result in a data block of a blockchain that is managed by a plurality of blockchain peer nodes;
- storing the encryption key in a local encryption key store; and
- deleting the encryption key from the local encryption key store in response to a request and transmitting a deletion request to delete the encryption key to other blockchain peer nodes among the plurality of blockchain peer nodes.

17. The non-transitory computer readable medium of claim 16, wherein the storing the encrypted transaction result comprises storing an identifier of the encryption key within the transaction result.

18. The non-transitory computer readable medium of claim 16, wherein the transaction request comprises a deletion request received from a user, and the method further comprises transmitting the received deletion request to the other blockchain peer nodes.

19. The non-transitory computer readable medium of claim 16, wherein the encrypting comprises encrypting a value of one or more key/value pairs and not encrypting a corresponding key of the one or more key/value pairs.

20. The non-transitory computer readable medium of claim 16, wherein the method further comprises broadcasting the encryption key to the plurality of blockchain peer nodes.

* * * * *